Dec. 11, 1962

G. R. ARCHER 3,068,350

RESISTANCE HEATING CONTROL

Filed Aug. 21, 1958

INVENTOR
George R. Archer
BY
ATTORNEY

Dec. 11, 1962 G. R. ARCHER 3,068,350
RESISTANCE HEATING CONTROL
Filed Aug. 21, 1958 2 Sheets-Sheet 2

INVENTOR
George R. Archer
BY
ATTORNEY

United States Patent Office 3,068,350
Patented Dec. 11, 1962

3,068,350
RESISTANCE HEATING CONTROL
George R. Archer, Salfordville, Pa., assignor, by mesne assignments, to Robotron Corporation, a corporation of Michigan
Filed Aug. 21, 1958, Ser. No. 756,397
21 Claims. (Cl. 219—110)

This invention pertains to controls for resistance heating and more particularly to controls for the production of prescribed temperature conditions within a workpiece subjected to resistance heating.

Resistance heating, as used herein, contemplates the conduction of electrical current through a workpiece and the heating thereof due to the dissipation of electrical energy within the material of the workpiece.

Examples of resistance heating to which the control of this invention may be applied include annealing, particularly the selective annealing of certain portions only of a workpiece, and resistance welding where production of a weld nugget bond between the parts of a workpiece requires that a sufficient temperature be attained at the workpiece interface for the material of the workpiece to be fused.

In the past, temperature conditions within a workpiece have been programmed by means of pre-set electrical input patterns. Pre-set input control, however, cannot compensate for variations in the inconstant and indeterminant resistive characteristics of a workpiece which occur during a resistance heating operation.

It can be shown, however, that the workpiece temperature condition at equilibrium is directly related to potential difference measured along the path of a current through the workpiece when the flow of the heat generated by that current is also, predominantly, along the same path.

When equilibrium temperatures are established within a workpiece during a resistance heating operation the output power, the rate at which heat energy is lost from the workpiece, is equal to the input power, the rate at which electric energy is delivered to the workpiece. Output power is determined by workpiece temperature and thermal resistance; input power is determined by workpiece voltage and electrical resistance. The thermal and electrical resistances of materials are directly related and, consequently, equilibrium temperature is determinable by monitoring and constraint of but a single variable, the workpiece voltage.

Therefore, it is a general object of this invention to provide an improved resistance heating control which assures the production of a desired temperature condition within a workpiece.

Another general object is to provide a fast acting resistance heating control which senses and corrects for variations of workpiece characteristics occurring during a resistance heating operation.

A specific object is to provide a control which senses the voltage developed across a workpiece during a resistance heating operation and which constrains this voltage in a manner to assure the production of a desired temperature condition within the workpiece.

According to the illustrated aspects of this invention, a resistance heating operation on a workpiece in contact with opposed electrodes is controlled to produce a desired heating effect related to an equilibrium temperature condition for the material of the workpiece by passing a variable electric current through the electrodes and the workpiece in series, channeling the heat flow from the workpiece to the electrodes, generating a reference voltage equivalent to the equilibrium temperature condition, generating a workpiece voltage equivalent to the voltage drop across the workpiece produced by the current, generating a difference voltage proportional to any difference between the reference and workpiece voltages, and varying the current according to the magnitude and sign of the difference voltage constraining the workpiece voltage to be substantially equal to the reference voltage during the operation, thereby assuring the attainment of the desired heating effect regardless of workpiece resistance variations.

While the subject matter of this invention is particularly pointed out in the appended claims, a better understanding may be had from the following description in conjunction wtih the accompanying drawings in which:

Figure 1:
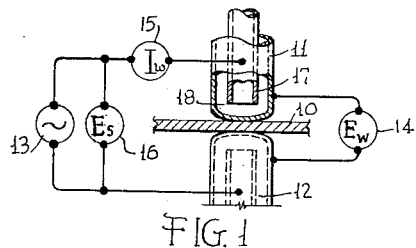
FIG. 1 is an elementary diagram illustrating the theoretical basis for this invention.

Referring now to FIGURE 1, the theoretical basis for the control of this invention assumes summed parameters for the immediate environment of a workpiece 10. The electrodes 11 and 12 are in thermal and electrical contact with the workpiece 10 and are connected to a power source 13. The electrical energy input rate, or power, delivered to the workpiece 10, is equal to the product of the effective current $I_w$ through the workpiece and the effective voltage $E_w$ developed across the workpiece. Where the power source, as shown, is an alternating current device, the effective values of $E_w$ and $I_w$ are the respective root means square values as measured by an A.C. volt meter 14 and an A.C. ammeter 15. For direct current, the effective values would be those measured by comparable D.C. instruments. It should be noted that while the current is the same throughout the series circuit, the voltage measured across the power source 13, as by volt meter 16, will be different from that measured across the workpiece because of power losses in the transmission circuits. The rate at which electric energy is dissipated within the material as heat may be represented as an input power $P_i = E_w I_w$.

The temperature of the workpiece will be raised by the input and heat will flow from the workpiece. The heat loss rate, a power output $P_o$, is a function of the temperature T and of thermal conductance K of the workpiece. When the heat loss is confined primarily to conductance, radiation losses may be neglected and when the workpiece temperature range is sufficiently high, ambient temperature variations are unimportant. Under these conditions, the heat loss may be equated as an output power $P_o = KT$ without significant error.

After a finite energy input to the workpiece, depending upon its thermal capacity, an equilibrium condition will be established when the input power $P_i$ is equalled by the output power $P_o$. Letting $T_e$ represent the temperature at equilibrium, the input-output power balance, $P_o = P_i$, is expressed by $$E_w I_w = c^2 K T_e \qquad (1)$$

where $c^2$ is a proportionality constant.

By Ohm's law, $I_w = E_w / R'_w$ where $R'_w$ is the electrical resistance traversed by the current $I_w$. By definition, $K = 1/R''_w$ where $R''_w$ is the thermal resistance traversed by the flow of heat through the workpiece. Therefore, Equation 1 above may be rewritten as $$E_w^2 / R'_w = c^2 T_e / R''_w \qquad (2)$$

The thermal resistances $R''_w$ and electrical resistances $R'_w$ are proportionally related along the same paths. Assuming heat flow and current flow paths are coincident, Equaiton 2 above may be simplified as $$E_w^2 = k^2 T_e \qquad (3)$$

where $k^2$, a proportionality constant, is a characteristic of the workpiece materials.

The assumptions necessary to the validity of Equation 3 are justified at the annealing and fusion temperatures of metals when the opposed electrodes 11 and 12 remain relatively cool and provide the predominant heat sinks for the flow of heat from workpiece 10. Preferably, the electrodes 11 and 12 are cooled, as by water or other coolant delivered through a tube 17 and discharged through the annular space 18 between tube 17 and electrode 11. However, solid electrodes of a highly conducting material such as a copper alloy, may provide sufficient cooling in some applications.

The significance of Equation 3 is that for any desired workpiece temperature condition which may be related to an equilibrium temperature $T_e$, there is a voltage $E_w$ which, if maintained across the workpiece for a sufficient time, will assure the attainment of the desired condition irrespective of resistance variations in the heating circuit through the workpiece.

For most applications it is expedient to determine by experiment the workpiece voltage $E_w$ which corresponds to the desired temperature condition. Test runs may be made on sample workpieces at differing values of workpiece voltage $E_w$. The value of $E_w$ which produces the desired temperature condition, referred to as the reference voltage $E_R$, is used thereafter on any workpice of the same materials as the sample.

Variations, other than of materials, among subsequent workpieces and operational conditions will not affect the attainment of the desired temperature condition since Equation 3 above is independent of other variables. By contrast, temperature conditions produced by conventional heating operations are affected by any variation accompanied by a change in thermal or electrical resistances. These resistances comprise contact resistances, bulk resistances, and shunting resistances. The contact resistances arise at the interfaces between elecrodes and the workpiece and between the parts of the workpiece and vary with contact pressure and with surface conditions. The bulk resistance of materials depends upon traverse dimensions and upon resistivity-temperature characteristics. Shunting resistances vary with the proximity of parallel low resistance paths. There is also the pseudo-resistive effect of source voltage variation; however, any increase or decrease of the source voltage produces the same change in the workpiece voltage as would a proportional increase or decrease of resistance and hence is compensated for by keeping workpiece voltage equal to a constant.

It is the flow of current $I_w$ through the workpiece resistance $R_w$ which develops the workpiece voltage $$E_w = I_w R_w$$

Therefore, any given value of workpice voltage may be maintained by adjustment of the current $I_w$ whenever the actual workpiece voltage, (referred to as $E_A$) departs from the reference voltage $E_R$.

Adjustment of the workpiece current may be by any conventional means such as a variable impedance in the power supply circuit, or by means of the systems described below.

Figure 2:
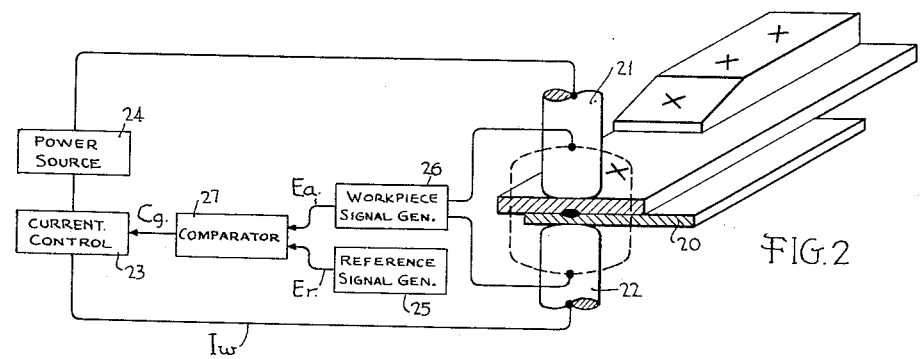
FIG. 2 is a block diagram of a system for the control of this invention.

FIG. 2 illustrates a general system for the control of this invention. A workpiece 20 is shown in thermal and electrical contact with opposed electrodes 21 and 22. These electrodes 21 and 22, parts of a resistance welder for example, are connected in series with the workpiece 20 and a current control 23 to a source of power 24. A reference signal generator 25 generates a reference workpiece voltage $E_R$ equivalent, according to Equation 3 above, to the temperature condition desired for workpiece 20. A workpiece signal generator 26 is connected in parallel with the workpiece 20 and generates a voltage $E_A$ equivalent to the voltage drop produced across workpiece 20 by a current $I_w$ in the series circuit. A comparitor 27 is coupled to the reference and workpiece voltage generators and sets up a comparison between $E_R$ and $E_A$. Comparitor 27 generates the control signal $C_g$ according to any difference in the comparison.

A workpiece heating operation is commenced at an initial value of workpiece current $I_w$. This current flowing through the workpiece resistance $R_w$ develops a voltage $E_A$ across the workpiece. When $E_A$ differs from the predetermined reference voltage $E_R$, a current adjustment is prescribed by change signal $C_g$, and the adjustment is continued or repeated unless $E_A$ becomes and remains substantially equal to $E_R$. The system of FIG. 2 is therefore a closed-loop regulator or servo system which may be operated to produce any desired workpiece condition related to an equilibrium workpiece temperature represented by workpiece voltage $E_R$.

Figure 3:
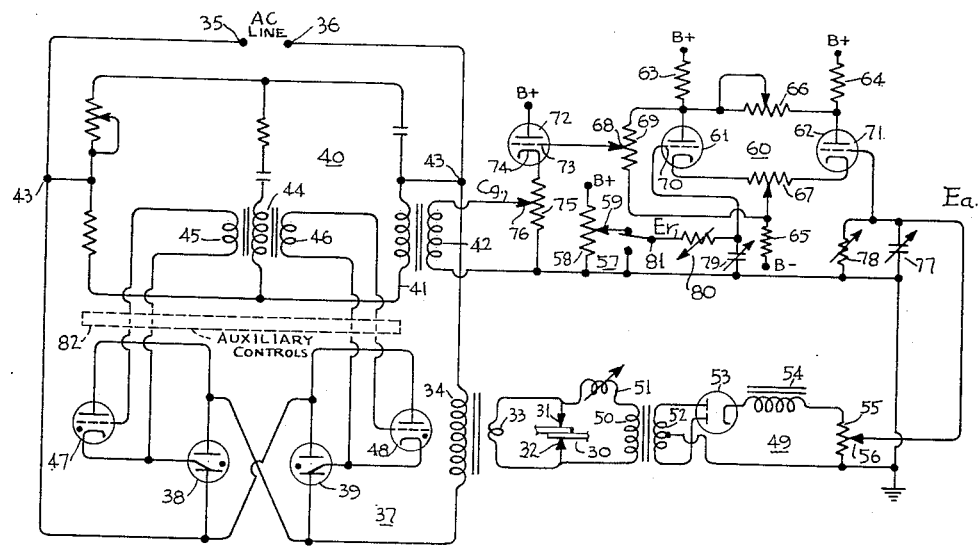
FIG. 3 illustrates a simplified electronic circuit for the system of FIG. 2.

FIG. 3 illustrates the synthesis of conventional components into the control system of FIG. 2. As above, a workpiece 30 is operationally positioned between opposed electrodes 31 and 32. The electrodes are coupled by means of power transformer secondary 33 and primary 34 to an alternating current power source at terminals 35 and 36. An input control 37, connected in series between the power transformer primary 34 and power source terminal 35, includes the contactor circuit of cross-connected ignitrons 38, 39 and a phase shift bridge circuit 40. The A.C. winding 41 of a variable inductor forms one arm of the bridge 40 and the associated D.C. winding 42 is arranged to be energized by the $C_g$ signal referred to above.

The phase shift and ignitron contactor circuits of input control 37 are well understood by those familiar with resistance heating and are set forth in detail in "Electronics in Industry" by George M. Chute, McGraw Hill Book Co., New York, N.Y. (1956). One diagonal of the bridge 40 is connected across the power source at terminals 43, 43 and the other diagonal includes a saturable reactor primary winding 44. Voltage pulses are induced in the saturable reactor secondary windings 45, 46 at a phase lag with respect to power source alternations which is a function of the $C_g$ signal impressed upon the variable inductor D.C. winding 42. These pulses initiate conduction by thyratrons 47 and 48 which, in turn, initiate conduction of current pulses by ignitrons 38 and 39 for the remainder of each half cycle of the power supply. The current passed by ignitrons 38 and 39 through the power transformer primary 34 induces a current in the series circuit of power transformer secondary winding 33. This latter current traverses the workpiece 30 between electrodes 31, 32 and is the workpiece current $I_w$. Consequently, the workpiece current may be adjusted by variation of change signal $C_g$ to any desired value within the operational range of input control 37.

The voltage drop produced across workpiece 30 by the workpiece current $I_w$ is sensed by workpiece signal generator 49 which includes a step-up transformer having a primary winding 50 connected to electrodes 31 and 32. Compensating inductor 51 is inserted in series with primary 50 to compensate for inductive tool effects which might otherwise cause the voltage and current in this circuit to be out of phase. The voltage developed across step-up transformer secondary winding 52 is rectified by full wave rectifier 53, filtered by inductor 54, and appears across potentiometer 55. One end of potentiometer 55 is maintained at a reference potential or ground, so that the potential at potentiometer tap 56 represents the actual workpiece voltage $E_A$.

Reference signal generator 57 is shown as a potentiometer 58 connected between ground and a source of positive potential. Tap 59 is adjustable to provide a reference voltage $E_R$ which may be selected according to Equation 3 above to be equivalent to the desired temperature condition for workpiece 30.

Comparitor 60 includes the differential amplifier circuit of cathode coupled triodes 61, 62 as described in U.S. Patent No. 2,677,729. Anode resistors 63, 64 are made equal to each other and to twice the resistance of the common cathode resistor 65. Variable high impedance resistor 66 and low impedance potentiometer 67 are adjusted to compensate for differences in the characteristics of triodes 61 and 62. Because the triode currents remain equal, the output potential at mid-tap 68 of shunting resistor 69 remains constant when input potentials on control grids 70 and 71, though varied, remain equal. When the grid voltages are unequal, however, the triode currents will differ and a difference voltage will appear at mid-tap 68. Cathode follower 72 provides for a low impedance output and includes control grid 73 connected to mid-tap 68 and cathode 74 connected through output resistor 75 to ground. A tap 76 connects the variable inductor winding 42 of phase shift bridge 40 across output resistor 75 to ground. Control grid 70 of triode 61 is connected to tap 59 of reference voltage generator 57 and is at the preset reference potential $E_R$. Control grid 71 of triode 62 is connected to tap 56 of workpiece signal generator 49 and follows the actual workpiece potential $E_A$. Consequently, the potential at tap 68 is a difference voltage proportional to any difference between $E_R$ and $E_A$. The cathode follower output potential at tap 76 follows this difference voltage. This latter signal is impressed upon variable inductor winding 42 and determines the condition of phase shift bridge 40.

Since an alternating current power source will produce a pulsating waveform for $E_A$, a storage capacitor 77 and a discharge resistor 78 are connected in parallel between control grid 71 and ground to filter out the A.C. components of the $E_A$ voltage. However, capacitor 77 will not be charged instantaneously at the beginning of a heating operation and to compensate therefor, a capacitor 79 is connected between control grid 70 and ground and resistor 80 is inserted in series between control grid 70 and tap 59 of reference voltage generator 57. Switch 81 is provided for discharging capacitor 79 to ground. The time constant of the parallel R.C. network of capacitor 78 and resistor 77 and the time constant of the series R.C. network of capacitor 79 and resistor 80 are adjusted so that the control grid voltages of triodes 61 and 62 are substantially equal until capacitor 77 is charged sufficiently to follow the envelope of the $E_A$ waveform.

Application of the system of FIG. 2 to resistance heating control according to this invention requires that a reference voltage $E_R$ be determined equivalent to an equilibrium temperature $T_e$ of the material of the workpiece. This voltage is most easily found by experiment on sample workpieces. Thereafter, tap 59 on potentiometer 58 of the reference signal generator is adjusted accordingly. Auxiliary controls 82 may be employed for starting and terminating the heating operation and may include means coupled with reference signal generator 57 for operating switch 81.

Additionally, the auxiliaries 82 may include means to translate tap 59 on potentiometer 58 of the reference signal generator at prescribed times to provide for different temperature conditions during successive portions of a single heating operation. It is often desirable during a resistance welding operation, for example, to provide a pre-heat period, a fusion period, and a post-heat period. These three temperature conditions may be prescribed by three values of $E_R$, each predetermined experimentally as satisfying Equation 3 above for corresponding equilibrium temperatures. Fusion is assured by prescribing for a fusion period, a reference voltage equivalent to an equilibrium temperature which is higher than the fusion temperature of the materials to be welded. As heat is supplied at a rate determined by the fusion period reference voltage, the workpiece temperature will increase until fusion begins and then remain nearly constant at the fusion temperature during the change of state of the weld nugget volume. The fusion period is terminated upon development of a desired weld nugget size. This, of course, will occur before the equilibrium temperature equivalent to the fusion period reference voltage has been achieved.

The unique advantage of the control of this invention as applied to resistance welding is that fusion is assured regardless of resistive variations in the weld current circuit. Cold welds, lack of fusion, which frequently occur during conventionally controlled welding are prevented because the workpiece temperature must necessarily reach the fusion temperature since the input power is maintained at a level to produce an equilibrium temperature higher than the fusion temperature.

Figure 4:
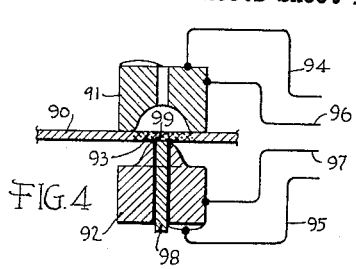
FIG. 4 is a representation of apparatus for the application of this invention to a particular annealing operation.

FIGURE 4 illustrates a specific annealing setup to which the control of this invention may be advantageously applied. A sheet metal workpiece 90 of a hardened material is to be formed with a protrusion and a perforation therethrough by operation of the die parts 91 and 92. The forming operation on the workpiece material within the crosshatched area 93 can only be accomplished satisfactorily if the area 93 is first softened or annealed by a heating operation. To obviate a two station process by which the workpiece is first annealed in a furnace and then transported to a die forming press, the die parts 91 and 92 are made the electrodes of a resistance heating circuit through the workpiece 90. Power conductors 94 and 95 are connected to a variable current power source (e.g. power transformer secondary 33 of FIG. 3) and workpiece voltage signal conductors 96 and 97 are connected to a workpiece signal generator input (e.g. step-up transformer primary 50 of FIGURE 3) of an equivalent system as set forth generally in FIGURE 2 or specifically in FIGURE 3 and in FIGURE 4 below.

The annealing operation is then accomplished by maintaining an actual workpiece voltage $E_A$ across the workpiece 90 substantially equal to a reference voltage $E_R$ experimentally predetermined as equivalent, according to Equation 3 above, to the desired annealing temperature. Thereafter, die parts 91 and 92 are moved together by any conventional means, not shown, to produce the desired protrusion. By further action of the mechanical means, the perforating die insert 98 may be translated to punch out material within the area 99 at the center of the protrusion.

In addition to elimination of separate processing stations, a prime advantage of the selective annealing control as described above is the close confinement of the annealed zone 93 to the minimum required for a subsequent forming operation. Obviously, conventional furnace annealing cannot be applied to certain portions only of workpiece volume and, in the past, resistance heating has been impractical because workpiece temperatures could not be closely controlled. By the control of this invention, however, selected portions of the workpiece may be maintained at an equilibrium temperature, the annealing temperature, with any desired precision.

Figure 5:
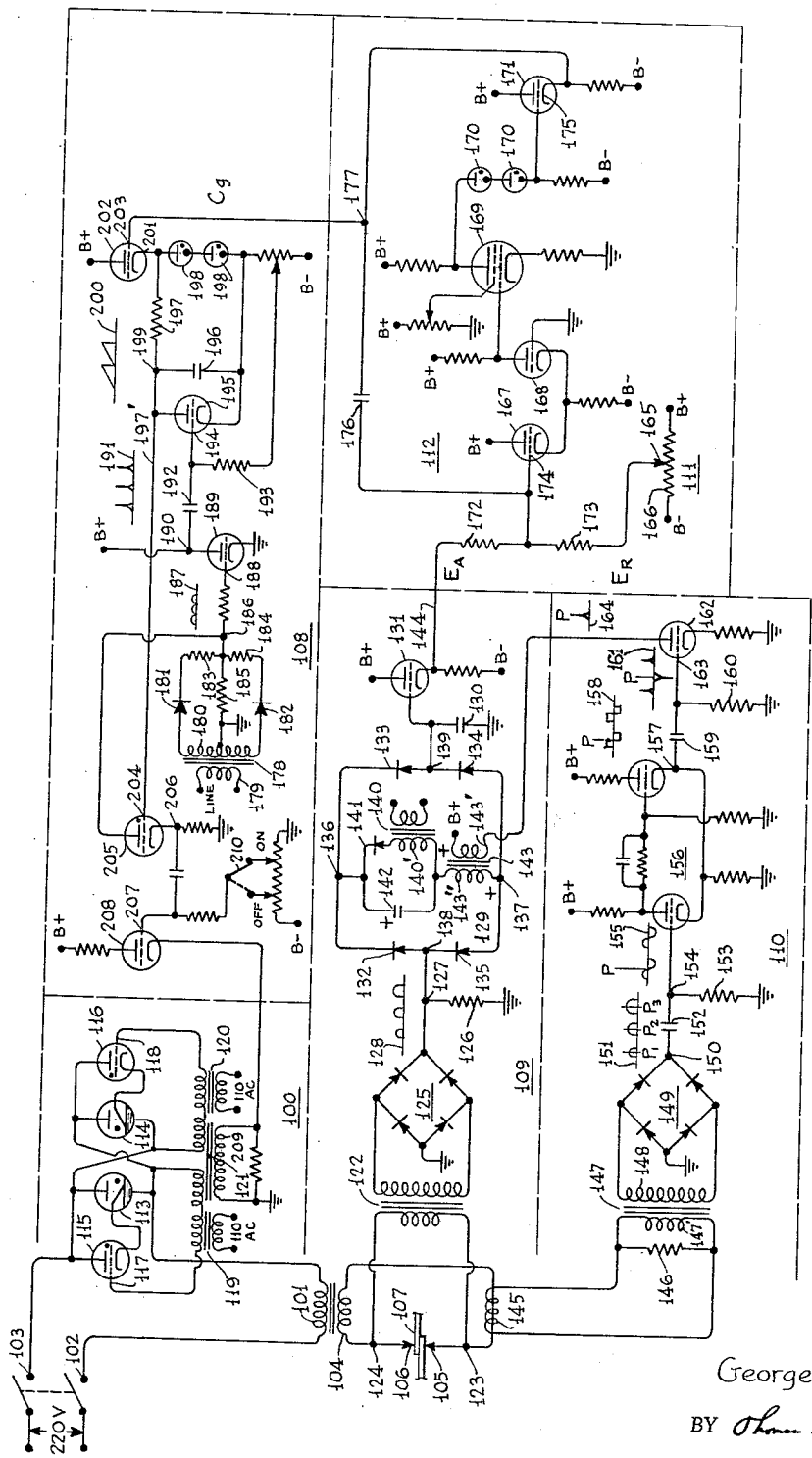
FIG. 5 illustrates a preferred electronic circuit for the control of this invention.

FIGURE 5 illustrates a preferred circuit for a fast acting resistance heating control according to this invention. A primary application of this preferred circuit is to the resistance welding of thin sheet metal workpieces where fusion periods are equivalent to but a few half cycles of an alternating current input. Explanation of the circuit will be directed toward such an application. The functional elements illustrated correspond generally to those of FIGURE 2 and include an alternating current contactor 100 connected in series with a power transformer primary 101 to power mains at terminals 102 and 103. For the purposes of this illustration, a 60 cycle alternating current source is assumed. It will be apparent, however, that the circuit may be adapted to higher frequency power supplies where desirable. As above, power transformer secondary 104 is connected in series with a pair of electrodes 105, 106 which may be portions of a conventional welding machine and operable to be placed in thermal and electrical contact with workpiece 107. Instead of the phase shift bridge contactor control of FIGURE 3, the circuit of FIGURE 5 utilizes a timing pulse generator 108 to prescribe the phase lag between alternations of the source voltage and conductance by contactor 100. The workpiece signal generator 109 is controlled by demodulator circuit 110 which causes the actual voltage wave form to be sampled at times coincident with the peak of each half cycle of the workpiece current. The reference signal generator 111 comprises a simple voltage divider. Comparison of the actual voltage $E_A$ and reference voltage $E_R$ is accomplished by means of an operational amplifier comparitor circuit 112 which provides a change signal $C_g$ according to any difference in the comparison. The change signal output from comparitor 112 is applied to timing pulse generator 108 to complete the regulator close-loop control of the heating current.

The contactor 100 includes a pair of inversely connected ignitrons 113 and 114 and associated thyratrons 115 and 116 connected between ignitron anode and igniter electrodes. Thyratrons 115 and 116 are biased against conduction by a hold-off voltage applied to control grids 117 and 118 by means of hold-off transformers 119 and 120. During a first half cycle of the source voltage when the anode of ignitron 113 is positive, a firing pulse induced in firing pulse transformer 121 overcomes the bias voltage allowing conduction by thyratron 115 which in turn ignites ignitron 113. Upon ignition, tube 113 continues to conduct for the remainder of that positive half cycle, and then becomes non-conducting until again ignited by the above sequence upon reception of a succeeding properly timed firing pulse. The circuit operation for ignitron 114 is similar to that for ignitron 113 except that ignitron 114 is operable to conduct during the alternate, or second, half cycles of each cycle of the power supply. The heating effect of the current passed by contactor 100 to the power transformer 101, 104 and hence through workpiece 107 is a function of the delay between the start of each half cycle of the source and the reception of a firing pulse at transformer 121.

Workpiece signal generator 109 comprises step-up transformer 122, connected across the workpiece 107 at terminals 123, and 124 and to full wave rectifier bridge 125, the latter being connected across loading resistor 126. The bridge output at terminal 127, represented at 128, has the rectified wave form of the voltage developed across the workpiece 107 and is proportional in amplitude thereto. Bi-directional half wave switch 129 is interposed between terminal 127 and output stages of generator 109. These latter stages comprise storage capacitor 130 and cathode follower 131. The switch 129 comprises four assymetrically conducting devices, diodes 132, 133, 134 and 135, each forming an arm of a bridge circuit. The bridge diagonal between terminals 136 and 137 includes components for normally biasing terminal 136 positively with respect to terminal 137. With diodes 132, 133, 134, 135 orientated as illustrated, each is normally biased against conduction and therefore bridge terminals 138 and 139 are effectively isolated. When the biasing condition is reversed, terminals 138 and 139 are in effect superimposed and the switch 129 is closed or short-circuited therebetween. The normal bias is produced by transformer 140, diode 141, and capacitor 142. Capacitor 142 is connected between terminals 136 and 137, transformer secondary 140′ and diode 141 are connected in series across capacitor 142, and the latter is charged to the normal bias potential by connecting the secondary of transformer 140 to an alternating current power source. Transformer 143 is connected between terminal 137 and capacitor 142 so that a sufficient control pulse produced in primary 143′ induces in secondary 143″ a pulse of opposite polarity to the biasing voltage to render terminal 136 negative with respect to terminal 137. During the occurrence of the latter control pulse, diodes 132, 133, 134, 135 are biased in their forward, or conducting, direction so that whatever potential appears at terminal 127 is imposed upon storage capacitor 130. Cathode follower 131 provides for level setting and for a low impedance output. Consequently, the signal appearing on conductor 144 may be taken as the workpiece voltage signal $E_A$.

Since the magnitude of the reference voltage signal $E_R$ is to be determined empirically, the workpiece voltage signal $E_A$ need only be proportional to the amplitude of the workpiece voltage wave form at repeated sampling times during each half cycle of the alternating current input to the workpiece welding position. Therefore, the absolute values of the voltage signals are chosen to provide practical signal levels as required for operation of the electronic circuit elements.

The sampling pulses which operate switch 129 are to be provided by demodulator 110 coincidentally with peak values of the workpiece current to eliminate spurious inductive effects. The input stages for demodulator 110 comprise a current sensing coil 145 coupled with the load circuit through workpiece 107 and a parallel circuit arrangement of resistor 146 and step-up transformer primary 147. The potentials developed across resistor 146 by the load current alternations are impressed across primary 147′ and induce corresponding potentials in secondary 148. The latter voltage wave form is rectified by full wave rectifier bridge 149 and appears at terminal 150 as illustrated at 151. The voltage wave form 151 is differentiated by the combination of capacitor 152 and resistor 153 and appears at terminal 154 as illustrated at 155. The wave form 155 energizes the Schmitt circuit 156, a conventional cathode coupled bistable multivibrator whose output at terminal 157 is the square wave form illustrated at 158. The parameters for the Schmitt circuit 156 are adjusted so that the circuit switches from its first stable state to its second stable state when the input wave form 155 passes through critical voltage level at times coincident with the peaks, P1, P2, P3, of the undifferentiated wave form 151. Consequently, the square wave form 158 passes through zero in a negative direction at the occurrence of the peak of each half cycle of the workpiece current. The wave form 158 is differentiated by the network comprising capacitor 159, resistor 160 to take the form illustrated at 161. The output stage of the demodulator circuit comprises an amplifier tube 162 biased so as to be normally conducting and to be rendered non-conducting in response to the negative spikes of the wave form 161 applied to control grid 163. As tube 162 is cut off, a positive voltage pulse appears in its anode circuit and the switching transformer primary 143′ of switch 129 of the reference voltage generator 109. This wave form is illustrated at 164. It should be noted that polarities of the windings 143′ and 143″ are reversed so that the positive pulses of wave form 164 induce the necessary complementary voltage in transformer secondary 143″ to overcome the biasing potential on capacitor 142. During the period when switch 129 is effectively closed, storage capacitor 130 is charged to the potential of the workpiece voltage wave form. It should be noted that the stored potential on capacitor 130 is adjusted in either a positive or negative direction by the illustrated demodulator action.

The predetermined reference voltage $E_R$ for a given heating operation is derived from the setting of variable tap 165 on potentiometer 166 of the reference voltage generator 111. Conventional translating means, not shown, may be utilized to alter the value of the reference voltage $E_R$ during a heating operation to provide for multiple stage effects corresponding to more than one equilibrium temperature condition.

Comparitor 112 comprises an operational, direct coupled amplifier circuit of conventional design. It includes a differential amplifier stage, tubes 167, 168, a high gain amplifier stage, tube 169, and an output stage comprising voltage regulator tubes 170 and cathode follower 171. The input $E_A$ wave form is through input resistor 172 and the input $E_R$ voltage is through input resistor 173 to control grid 174 of tube 167. The output from comparitor 112 is taken from the cathode 175 of cathode follower 171. The output is coupled to the input through integrating capacitor 176 so that any difference in the values of the $E_A$ and $E_R$ signals is integrated with respect to time. This integrated error signal appears at terminal 177 and constitutes the input for firing pulse generator 108.

While operational details of switch 129, squaring circuit 156, and the operational amplifier of comparitor 112 are included here for completeness, specific details of these well known circuits may be found in "Pulse and Digital Circuits" by J. Millman and H. Taub, McGraw-Hill Book Company, New York, 1956.

The firing pulse generator 108 generates a triangular voltage waveform at the frequency of the alternating current power supply and superimposes it upon the error signal from comparitor 112. Oscillator components include transformer 178 having a primary 179 connected across the mains and a secondary 180 connected across the full wave rectifier circuit formed by diodes 181 and 182 and resistors 183, 184 and 185. The waveform at output 186, illustrated at 187, is impressed upon control grid 188 of amplifier 189. The parameters of amplifier 189 are adjusted so that the cusps of the 187 waveform are inverted and amplified producing the output waveform at terminal 190 illustrated at 191. The latter waveform is differentiated by the combination of capacitor 192 and resistor 193 and impressed upon the control grid 194 of tube 195. Tube 195 is connected in parallel across capacitor 196 which is charged through resistor 197 to the steady voltage provided across voltage regulator tubes 198. The potential at capacitor terminal 199, therefore, will assume the triangular waveform illustrated at 200 as capacitor 196 is periodically discharged at twice the source frequency. Voltage regulator tubes 198 are connected between B potential and cathode 201 of cathode follower 202. The error signal from comparitor 112 is applied to the control grid 203 of cathode follower 202 and, consequently, a corresponding potential is applied to conductor 197' which follows the variations of the error signal. The net voltage on conductor 197' therefore is the sum of the triangular waveform 200 and the error signal voltages. The error signal is referred to herein as a change signal $C_g$ since, in its absence, firing generator 108 is invariant in its operation. The superimposed voltages on conductor 197' are impressed upon control grid 204 of thyratron 205. Tube 205 is non-conducting until a critical control grid voltage is exceeded. Thereupon thyratron 205 passes a tube current causing a sharp negative step to appear in the potential at terminal 206 of its cathode circuit. This negative step is applied to the control grid 207 of output amplifier 208 rendering the latter tube non-conducting from its normally conducting state and causing a corresponding negative step voltage in primary 209 of the firing transformer 121 of the contactor 100. Such a firing pulse causes ignition of the contactor ignitrons as explained above and consequent programming of the current input to the heating circuit. The windings of transformer 121 are arranged so that the induced firing pulses are of the polarity and magnitude to provide conduction alternately by thyratrons 115 and 116 during successive half cycles of the source voltage.

Start-stop operation is provided by switch 210 in pulse generator 108. Switch 210 completes a bias voltage circuit for control grid 207 of output amplifier 208. With switch 210 in the operative position illustrated, tube 208 conducts; switching to the alternate position impresses a sufficient negative voltage on control grid 207 to render tube 208 non-conducting, blocking the transmission of further firing pulses to contactor 100.

To summarize the operation of the circuit of FIGURE 5, assume that a reference voltage $E_R$ has been determined as equivalent to a desired temperature condition for workpiece 107. The operation is started by cycling switch 210 to the ON position. An actual weld voltage signal $E_A$ is produced at a level corresponding to the voltage drop across the workpiece as corrected during each half cycle of the source voltage. A comparison is set up between $E_A$ and $E_R$ and a change signal $C_g$ is generated at a level equivalent to any difference in the comparison. The $C_g$ voltage is superimposed upon a time-dependent voltage waveform synchronized with the source voltage. A critical input voltage at tube 204 of generator 108 is exceeded by the superimposed voltages during each succeeding half cycle of the source, at a phase lag depending upon the magnitude of $C_g$. After initiation of a firing pulse upon reception of the critical grid voltage at tube 204, the operable ignitron 113 or 114, conducts current for the remainder of one-half cycle. The heating effect of the input to the workpiece depends upon the ignitron conduction period. Therefore, adjustment of the heating effect of the input is accomplished as continuously as alternating current contactor action will permit, the $E_A$ signal is constrained to approach and remain substantially equal to the $E_R$ signal, and the desired temperature condition is assured during each heating operation.

While there have been described what are at present considered to be preferred embodiments of this invention, it will be obvious to those skilled in the art that various changes and modifications may be made without departing from the invention, and it is therefore, aimed in the appended claims to cover all such changes and modifications as fall within the true spirit and scope of the invention.

What is claimed is:

1. A system for the control of a resistance welding operation on a workpiece of a given material by resistance welding apparatus of the type including opposed electrodes coupled in series with a firing pulse responsive contactor to an alternating current power source, which system comprises actual voltage signal generator means coupled in parallel relationship with the workpiece generating a signal proportional to voltage drop across the workpiece between the electrodes, reference voltage signal generator means generating a reference signal predetermined as equivalent to a desired temperature condition for the workpiece, means setting up a comparison between the actual and reference signals generating a change signal proportional to any difference in the comparison, contactor firing pulse generator means responsive to the change signal generating firing pulses at a phase lag with respect to alternations of the source voltage corresponding to the magnitude of the change signal, whereby the heating effect of the input to the workpiece is continually adjusted to produce a desired heating effect regardless of resistive variations occurring during the welding operation.

2. A control system for operations to produce a desired temperature condition within the material of a workpiece by resistance heating apparatus of the type including opposed electrodes in thermal and electrical contact with the workpiece coupled in series with an alternating current contactor to a source of alternating current, which control system comprises means generating a reference voltage signal proportional to the voltage across the workpiece predetermined as equivalent to a desired equilibrium temperature of the workpiece, means coupled in parallel relationship with the workpiece generating an actual voltage signal proportional to the voltage drop across the workpiece between the electrodes, comparitor means responsive to the actual and reference voltage signals generating a change signal proportional to any difference between the actual and reference voltage signals, means generating contactor firing pulses at phase lags with respect to source voltage alterations corresponding to the magnitude of the change signal, whereby contactor action is continually adjusted in a regulatory direction to vary the input to the workpiece and produce the desired temperature condition regardless of resistive variations occurring during the heating operation.

3. A system for the control of a resistance heating operation on a workpiece in thermal and electrical contact with the electrodes of a resistance heating apparatus including a contactor responsive to a change signal voltage and connected in series with a source of power and the electrodes, which system comprises means connected in parallel relationship with the workpiece generating a first signal corresponding to the actual voltage developed across the workpiece by current therethrough, means generating a signal corresponding to a reference voltage proportional to a desired equilibrium temperature condition for the workpiece, means responsive to the actual and reference workpiece voltage signals generating change signal voltages according to any differences between the actual and reference signals whereby the input to the workpiece is adjusted to cause the actual workpiece voltage to become and remain substantially equal to the reference voltage during the heating operation.

4. The method of controlling the resistance heating operation of a workpiece in thermal and electrical contact with opposed electrodes of a resistance heating apparatus including a contactor connected in series relationship between a power source and the electrodes and responsive to the change signal to prescribe the effective current supplied to the workpiece, which method comprises the steps of generating a first signal corresponding to the voltage developed across the workpiece by the current, generating a reference signal corresponding to the workpiece voltage equivalent to a desired equilibrium temperature condition of the workpiece, setting up a comparison of the actual and reference workpiece voltage signals, generating a change signal corresponding to any difference in the comparison, and adjusting the effective value of the current according to the change signal, thereby assuring the production of the desired equilibrium temperature for the workpiece regardless of resistive variations occurring during the heating operation.

5. A system for the control of a resistance heating operation on a workpiece of given material to produce a desired equilibrium temperature condition for the material of the workpiece, which system comprises an adjustable input power supply supplying heating current to the workpiece, means generating an actual voltage signal according to the voltage drop produced across the workpiece by the current, means generating a reference voltage signal predetermined as equivalent to the desired equilibrium temperature condition, means generating a change signal proportional to any difference between the actual and reference signals, and means responsive to the change signal adjusting the input power supply constraining the actual signal to follow the reference signal.

6. A system for the control of a resistance heating apparatus including opposed electrodes in thermal and electrical contact with a workpiece, means removing heat from the electrodes, means connected in series relationship with the electrodes adjusting the effective current supplied to the electrodes in response to a change signal, means coupled in parallel relationship with the workpiece generating a signal proportional to the voltage drop across the workpiece, means generating a reference voltage equivalent to a workpiece voltage developed at a desired equilibrium temperature condition for the workpiece, and means responsive to the actual and reference signals generating the change signal according to any difference between the actual and reference signals.

7. A system for the control of resistance welding operations on a workpiece of given material at welding positions of variable and indeterminant series resistance which system comprises resistance welding apparatus including an alternating current contactor and opposed electrodes adapted to be serially connected with the workpiece and a source of power, means connected across the workpiece between the opposed electrodes generating a signal proportional to the voltage drop across the workpiece during a welding operation, means generating a reference voltage, means responsive to the workpiece and reference voltages generating a change signal according to any difference between the reference and workpiece voltages, and means responsive to the change signal adjusting the period of conduction by the contactor constraining the actual workpiece voltage to become and remain substantially equal to the reference voltage during a welding operation regardless of resistive variations occurring during the welding operation.

8. The method of resistance welding of a workpiece of a given material at successive welding positions of different and inconstant series resistance which method comprises the step of generating a reference voltage equivalent to a voltage drop across the given material determinant of an equilibrium temperature greater than the fusion temperature of the given material, and the concurrent steps at each successive welding position of supplying a variable electric power input to the workpiece, generating a signal voltage equivalent to the actual voltage drop across the workpiece, setting up a comparison of the reference and signal voltages, and varying the workpiece input in accordance with the comparison to cause the signal voltage to equal substantially the reference voltage during the pre-fusion portion of each welding operation thereby assuring fusion at each of the successive welding positions.

9. The mthod of resistance welding of a workpiece of a given material which method comprises the concurrent steps of supplying a variable electric power input to the workpiece, generating a signal voltage equivalent to the actual voltage drop across the workpiece, generating a reference voltage equivalent to a voltage drop determinant of an equilibrium temperature greater than the fusion temperature of the workpiece material, and varying the workpiece input to cause the signal voltage to equal substantially the reference voltage during the pre-fusion portion of the welding operation thereby assuring fusion during each welding operation.

10. The method of resistance welding of a workpiece of a given material at successive welding positions of different and inconstant series resistance which method comprises repeating at each welding position the concurrent steps of passing pulsating electric current of variable heating effect through the workpiece, generating a signal voltage equivalent to the actual voltage drop across the workpiece, generating a reference voltage equivalent to a voltage drop determinant of an equilibrium temperature greater than the fusion temperature of the material, and varying the heating effect of the current to cause the signal voltage to become and to remain substantially equal to the reference voltage during the pre-fusion portion of the welding period.

11. A system for the production of a desired equilibrium temperature condition within a workpiece of a given material and of varying series resistance between electrodes in thermal and electrical contact with opposed workpiece surfaces, the electrodes being serially coupled with a firing pulse responsive alternating current contactor to an alternating current power supply, which system comprises means generating a reference voltage corresponding to the voltage drop between the electrodes at the desired temperature condition for a workpiece, means coupled in parallel relationship with the workpiece generating an actual voltage corresponding to the actual voltage drop between the electrodes, means responsive to the actual and reference voltages generating a change signal voltage proportional to any difference therebetween, and means responsive to the change signal voltage generating the contactor firing pulses whereby the effective power input to the workpiece is continually adjusted to assure the attainment of the desired equilibrium temperature conditions.

12. The method of controlling a resistance heating operation on a workpiece of a given material at positions exhibiting different and inconstant resistances during the operation, which method comprises supplying an electrical input to the workpiece between opposed electrodes in thermal and electrical contact with the workpiece, removing sufficient heat from the workpiece at the electrode positions for the thermal and electrical current paths to be substantially similar, and maintaining a predetermined voltage drop between the electrodes during the heating operation by adjusting the electrical input rate.

13. The method of controlling a resistance welding operation on a workpiece of a given material at welding positions exhibiting different and inconstant resistances during the operation which method comprises the steps of supplying an electrical input to the workpiece between opposed electrodes in thermal and electrical contact with the workpiece, removing sufficient heat from the workpiece at the electrode positions for the thermal and electrical current paths to be substantially similar, and maintaining a predetermined voltage drop between the electrodes greater than the voltage drop equivalent to the fusion temperature of the workpiece material during the pre-fusion portion of the welding operation and adjusting the electrical input rate.

14. The method of controlling a resistance heating annealing operation to produce a desired annealing temperature within a localized volume of a workpiece of a given material exhibiting varying resistances during the operation, which method comprises supplying an electrical input to the workpiece between opposed electrodes in thermal and electrical contact with opposed surfaces of the volume, removing sufficient heat from the workpiece at the electrode position for the thermal and electrical current paths to be substantially similar, and maintaining a predetermined voltage drop between the electrodes equivalent to the desired annealing temperature during the heating operation and adjusting the electrical input rate.

15. The method of workpiece resistance heating which comprises maintaining a predetermined equilibrium-temperature-equivalent voltage across the series circuit between two opposed resistance heating electrodes and an interposed workpiece during resistive variations of the series circuit by successive adjustments of electric current input to the series circuit until a desired workpiece temperature condition has been achieved.

16. The method of resistance welding a composite workpiece which comprises maintaining a predetermined equilibrium-temperature-equivalent voltage across the series circuit between two opposed resistance welding electrodes contacting the workpiece during resistive variations of the series circuit by successive adjustments of electric current input to the series circuit until workpiece fusion has begun.

17. The method of resistance welding composite workpieces at variable-resistance welding positions which comprises the steps of constraining the actual voltage developed across the series circuit between two opposed resistance welding electrodes contacting an interposed composite workpiece at a welding position to become substantially equal to a reference voltage predetermined as equivalent to an equilibrium workpiece temperature greater than the fusion temperature of the workpiece material by successive adjustments of electric current input to the series circuit and maintaining by successive adjustments of electric current input to the series circuit the voltage constraint until workpiece fusion has occurred.

18. A system for the control of a heating operation on a workpiece of a given material by resistance heating apparatus of the type including opposed electrodes coupled in a series circuit with a firing pulse responsive contactor to an alternating current power source, which system comprises a first generator coupled with the electrodes generating a first voltage signal proportional to actual workpiece voltage between the electrodes, a storage means storing first signal voltages, a bidirectional switch coupled with and selectively coupling together and decoupling said first generator and said storage means in response to switching pulses, a second generator coupled with said series circuit and said switch generating switching pulses concurrent with peak values of current in said series circuit, a third generator generating a reference voltage signal predetermined as equivalent to a desired temperature condition for the workpiece, a comparitor coupled with said storage means and said third generator responsive to said actual and reference signal voltages generating an error signal corresponding in sign and magnitude to any difference between said signal voltages, and a fourth generator coupled with said comparitor responsive to said error signal generating firing pulses at a phase lag with respect to alternations of said source voltage corresponding to the error signal, whereby the heating effect of an alternating current input to the workpiece is bidirectionally adjusted for successive half cycles of said source and produces a desired workpiece temperature condition regardless of resistive variations occurring during the heating operation.

19. A system for the control of a heating operation on a workpiece of a given material by resistance heating apparatus of the type including opposed electrodes coupled in a series circuit with a firing pulse responsive contactor to an alternating current power source, which system comprises a first generator coupled with the electrodes generating a first voltage signal proportional to actual workpiece voltage between the electrodes, a storage means storing first signal voltages, a bidirectional switch coupled with and selectively coupling together and decoupling said first generator and said storage means in response to switching pulses, a second generator coupled with said series circuit and said switch generating switching pulses concurrent with peak values of current in said series circuit, a third generator generating a reference voltage signal predetermined as equivalent to a desired temperature condition for the workpiece, a comparitor coupled with said storage means and said third generator responsive to said actual and reference signal voltages generating an error signal corresponding in sign and magnitude to any difference between said signal voltages, an integrator coupled with said comparitor responsive to said error signal generating an integrated error signal proportional to integration with respect to time of said error signal, and a fourth generator coupled with said integrator and said contactor responsive to said integrated error signal generating firing pulses at a phase lag with respect to alternations of said source corresponding to the integrated error signal, whereby the heating effect of an alternating current input to the workpiece is bidirectionally adjusted for successive half cycles of said source and produces a desired workpiece temperature condition regardless of resistive variations occurring during the heating operation.

20. The method of claim 8 in which the step of supplying a variable electric power input to the workpiece is initiated at an input level causing an initial actual voltage drop determinant of an equilibrium temperature less than the fusion temperature of the given material.

21. The method of claim 9 in which the step of supplying a variable electric power input to the workpiece is initiated at an input level causing an initial actual voltage drop determinant of an equilibrium temperature less than the fusion temperature of the given material.

References Cited in the file of this patent

UNITED STATES PATENTS

| | | |
|---|---|---|
| 1,690,377 | Pugh | Nov. 6, 1928 |
| 2,472,042 | Davies | May 31, 1949 |
| 2,848,595 | Van Sciver | Aug. 19, 1958 |

FOREIGN PATENTS

| | | |
|---|---|---|
| 1,158,918 | France | Feb. 3, 1958 |